UNITED STATES PATENT OFFICE.

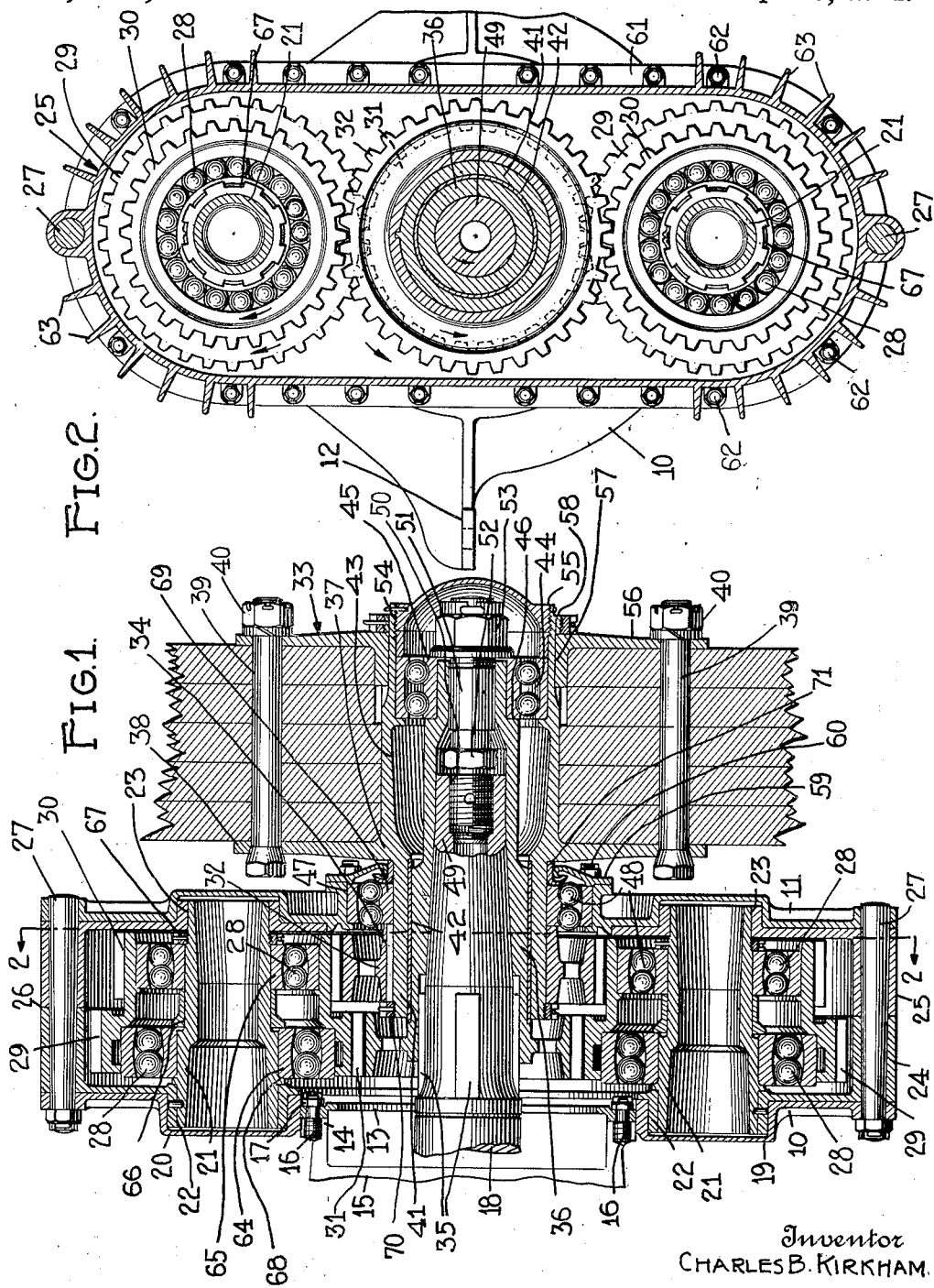
C. B. KIRKHAM.
REDUCTION GEARING.
APPLICATION FILED FEB. 28, 1917.
1,392,276. Patented Sept. 27, 1921.
Inventor
CHARLES B. KIRKHAM.
Attorney

CHARLES B. KIRKHAM, OF BUFFALO, NEW YORK, ASSIGNOR TO CURTISS AEROPLANE AND MOTOR CORPORATION, A CORPORATION OF NEW YORK.

REDUCTION-GEARING.

1,392,276.      Specification of Letters Patent.      Patented Sept. 27, 1921.

Application filed February 28, 1917. Serial No. 151,511.

*To all whom it may concern:*

Be it known that I, CHARLES B. KIRKHAM, a citizen of the United States, residing at Buffalo, in the county of Erie and State of New York, have invented certain new and useful Improvements in Reduction-Gearing, of which the following is a specification.

My invention relates to reduction gearing for an aeronautical propeller.

In the present stage of propeller development it is known that a propeller does not operate to the best advantage if run at too high a speed and the actual strength of the propeller *per se* also determines to a large degree the speed at which it may be successfully operated. In order to secure the most efficient motor operation it is necessary that the motor be run at extremely high speeds. It becomes apparent then that high speed engines should be used if the important factors of weight reduction and of most efficient operation are to be considered. The requisite high speed of motor operation imposed by the foregoing conditions is, however, far in excess of the most advantageous propeller speed. For these and other reasons it is found undesirable to drive the propeller at the same high speed as the motor.

There are certain types of reduction gearings in use for aeronautical motors but in accomplishing the requisite reduction a system is used which is so designed that immense bearings are necessary in order to take care of the radial and axial thrust developed. The immense bearings are not only bulky but they possess an excess of weight which is highly impractical. Moreover, the types of gearing now on the market require considerable alterations of the motor before they may be utilized. In fact, they are usually an inseparable part designed specially with the motor. It is the object of my invention to provide a reduction gearing which overcomes the aforesaid disadvantages.

My differential drive consists of correlated trains of spur gears carried within a unitary housing which may be attached or juxtaposed to the crank-shaft projection and crank case extremity of any aeronautical motor without any alterations in the design of the motor or any special provisions.

Of the drawings;

Figure 1 is a longitudinal sectional view of the differential drive;

Fig. 2 is a lateral sectional view along the line 2—2.

In Fig. 1 the rearward gear housing cover is shown as 10 and the forward housing cover as 11. These housing covers which contain and support the entire gear reduction mechanism are provided with supports or feet 12 (Fig. 2) which bear upon and are rigidly secured to the engine bed in the same way that the motor proper is supported. The rearward housing cover 10 engages and bears upon the annular flange 13 which is carried at the extremity 14 of the crank case 15. The flange 13 is secured to the crank case by means of a series of stud bolts as 16, Fig. 1, and simply serves to retain the regular motor bearings. The housing cover 10 is provided with the bearing surface 17, bearing on ring 16' which serves to maintain the housing in perfect alinement with the axis of the crank-shaft 18. The housing covers 10 and 11 are provided respectively with the pocketlike annular projections 19 and 20. These pockets are for the purpose of accommodating the hollow fixed pivot axes 21 which are supported at the points 22 and 23 within the linings 24 and 25. These linings 24 and 25 are jointed as at 26 and are held in clamping engagement one with the other by means of the tapered bolts 27 which penetrate the forward and rearward housings 10 and 11 and secure the entire structure. The linings 24 and 25 are preferably made of some light material, for instance aluminum. In addition to acting as a lining for the forward and rearward housing covers the portions 24 and 25 form the outside peripheral part of the gearing housing. The housing covers 10 and 11 are made of some material such as steel which possesses great strength in order that they may securely reinforce the lighter inner strucure of the housing. The utilization of light materials wherever possible contributes considerably to a reduction of weight which is a very important factor in aeronautical construction. Upon the axes 21, and revolubly supported by ball bearings wholly designated as 28, are pairs of gears 29 and 30 of different diameters.

These gears 29 and 30 are integrally formed and revolve simultaneously about the axis 21. The larger of said gears 29 is adapted to engage a gear 31 carried by the main crank-shaft 18, while the smaller of the two gears 30 engages simultaneously with the gear 32 which is attached securely to the axial extension of the propeller hub, wholly designated as 33, by means of the keys as at 34. The gear 31 is keyed securely to the crank-shaft 18 by means of a number of keys 35. The inner rings 64 and 65 of the ball bearings 28 are held fixed upon the pivotal support 21 by means of the spacer 66 and the ring 67 which is threaded onto the pivot and holds the inner rings 64 and 65 and the spacer 66 up against the shoulder projection 68. The inner ring 69 of the bearing 48 is held fixed to the bearing surface 41 by means of the ring 70 which is threaded onto the tubular portion 41 clamping the gear 32 and the ring 69 against the retainer 71 and the flange 38.

Extending from the hub of the gear 31 and integrally formed therewith is a sleeve or bushing 36 which extends coaxially with the crank-shaft 18, said bushing conforming to the taper of the crank-shaft extremity and revolving simultaneously therewith. The propeller hub wholly designated as 33 comprises a main body 37 which has a radially extending flange 38 which is arranged to engage the propeller in clamping engagement by means of the penetrating bolt and nut 39 and 40, a rearwardly extending bearing 41 which is lined with a suitable bearing material 42, and a forwardly extending substantially tubular portion 43. The gear 32 is keyed rigidly to the rearward bearing portion 41 by means of keys as at 34. The forward part of the propeller hub upon which fall the maximum stresses and loads is supported upon the crank-shaft extension bushing 36 by means of the ball bearing wholly designated as 44. The bearing 44 is so designed that it takes up the axial and radial thrust due to the revolving propeller. The inner annular bearing surface 45 of the ball bearing 44 is slipped onto the bushing 36 and up against the shoulder 46. Carried within the circular recess 47 of the forward housing cover 11 is an axial ball bearing 48 which aids in maintaining the alinement of the revolving propeller hub extremity 41. The crank-shaft extremity 49 is drilled and tapped in the usual manner as at 50 and a stud 51 is screwed into it. This stud carries an enlarged squared or hexagonal portion 52 for screwing it into the shaft 49. The forward or outward end of the stud 51 is provided with a castellated nut 53 which bears upon and clamps the inner annular ring 45 of the ball bearing 44 securely to the sleeve or bushing 36. The forwardly extending hub portion 43 is internally threaded as at 54 to receive the inclosing cap 55. The outside extent of the hub 43 receives the propeller flange 56 as at 57, and an externally threaded ring 58 is keyed to the hub section 43 to retain the flange 56 in close engagement with the remainder of the propeller hub. The hub flanges 56 and 38 are provided with the usual holes through which are passed the clamping or retaining bolts 39. In order to prevent a flow of oil from the gear housing the cover plate 11 is provided with annular caps 59 which are held by means of bolts and nuts 60, Fig. 1.

The two central portions of the housing 24 and 25 are provided with laterally extending flanges 61, Fig. 2, through which are passed the bolts 62 which hold the two sections in clamping engagement along the line 26, Fig. 1. The projecting fins or flanges 63, Fig. 2 are formed integral with the housing sections 24 and 25 to render them more rigid and to offer a cooling surface to radiate any heat which might develop within the mechanism.

The operation of my invention is as follows: Assume that the drive is designed for a reduction of fifty per cent. The crank-shaft 18 will revolve and carry with it the gear 31 which is rigidly keyed to said shaft. The driving gear 31 esgages the driven gear 29 which is of larger diameter than the gear 31. The gear 29 being integrally formed with the gear 30 the latter will revolve at the same rate as 29. The gear 30 is then a driving gear engaging with the driven gear 32. The driven gear 32 being of larger diameter than its driving gear 30 will revolve at a decreased rate. The gear 32 is rigidly keyed to the propeller hub 33 through the extension bushing 41. The bushing 41 revolves within the ball bearing 48, upon the bearing 44 and the bearing surface 42 carried by the sleeve 36, which sleeve 36 revolves with the crank-shaft 18. The direction of revolution of the sleeve 36 and the bushing 41 is the same, hence the relative motion of the two parts depends solely upon the ratio of reduction provided by the design of the gears. In the case of the fifty per cent. reduction ratio the bushing 41 and hub 33 will revolve at half the speed of the crank-shaft 18.

It will be seen that at the point where maximum stress, due to the revolving propeller, occurs, an adequate support is offered the propeller hub proper by providing the ball bearing 44 upon the crank-shaft extension bushing 36.

The bearing of my invention is readily adapted to any aeronautical motor without alterations in the design of same since the extension bushing 36 fits any standard shaft as 49. The annular opening provided by the alining surface 17 simply slips over the crank case extremity, the entire drive being held by means of clamping bolts which hold the supports or feet 12 upon the engine bed in the same manner that the engine is held down.

In view of the fact that the radial thrust is entirely taken care of by the differential it is not necessary to provide the motor with excessively large bearings on the propeller end. In fact the motor may use smaller and lighter bearings when used in connection with my reduction gearing than when used without it.

Although for purposes of clarity I have described certain detailed forms and preferred constructions, it is understood that interpretation of the invention should be made only in view of the subjoined claims.

What is claimed is:

1. A driving connection for aeronautical propellers, including a crank case and stub shaft projecting therefrom, an extension for said stub shaft comprising a sleeve insertable axially thereon and overhanging the outer end thereof, a driving connection between said extension and said stub shaft, means for retaining the extension on the stub shaft, a propeller hub bearings for carrying the propeller hub and located respectively on the overhanging and inner ends of said extension, and a means interposed between said propeller hub and said stub shaft to produce relatively different rotative speeds of said stub shaft and said propeller.

2. A driving connection for aeronautical propellers including a crank case, a stub shaft projecting therefrom, an extension for said stub shaft comprising a sleeve insertible axially thereon and overhanging the outer end thereof, a driving connection between said stub shaft and said extension, means for retaining the extension on the stub shaft, a propeller rotatively mounted upon said extension, bearings for the propeller located respectively on the overhanging and inner ends of said extension, and a unitary reduction gear mechanism surrounding said stub shaft and carried by the crank case for changing the relative rotative speeds of the propeller and the stub shaft.

3. A reduction gear mechanism for aeronautical propellers including a stub shaft driving gear fixed thereto, an extension for said stub shaft comprising a sleeve insertible thereon and fixed thereto, a propeller hub journaled upon said sleeve a driving gear fixed to said hub, and two pairs of diametrically opposed reduction gears located on opposite sides of said shaft, the gears of each pair being fixed to rotate together and meshing with the aforesaid gears which are fixed respectively to the stub shaft and to the propeller hub.

4. A unitary reduction gear mechanism for aeronautical propellers comprising a stub shaft an extension sleeve adapted to be attached to the stub shaft, a propeller hub sleeve rotatively mounted on said extension sleeve, bearings for the hub sleeve located respectively on the overhanging and inner ends of said extension sleeve, a driving gear carried by said propeller hub sleeve on its inner end a driving gear carried by said extension sleeve on its inner end juxtaposed to said first named gear, a detachable reduction gear casing surrounding said stub shaft and the inner end of said extension sleeve, said casing being supported independently of the propeller hub and stub shaft, and reduction gears carried by said casing and intermeshing with the aforesaid gears which are attached respectively to the propeller hub and the extension sleeves.

5. In a driving connection for aeronautical propellers, a driving shaft, an extension sleeve carried by said shaft and fixed thereto, said sleeve overhanging the end of said shaft, a propeller journaled on said extension sleeve, bearings for the propeller located respectively on the overhanging and inner ends of said sleeve, means for retaining the outer of such bearings and said extension sleeve in their proper axial position on said shaft, and a reduction gear mechanism interposed between said driving shaft and said propeller.

6. In combination, an aeronautical motor, a propeller therefor, a crank shaft extension for said motor, said extension having an external bearing surface at one extremity, a ball bearing at the other extremity, means retaining said extension in engagement with said shaft a driving connection between said propeller and said motor.

7. In combination with an aeronautical motor, a propeller, driven thereby a drive shaft, an extension for said shaft comprising bearing and supporting surfaces for the propeller, and a gearing mounted between said propeller and said motor to reduce the speed of the former with respect to the latter.

8. In a driving mechanism for an aeronautical propeller, in combination, a driving shaft, a propeller hub comprising an extended hub sleeve, the extended portion of the sleeve and driving shaft being formed with complemental bearing surfaces, a ball bearing mechanism interposed between said propeller hub and the end of said shaft, a reduction gear casing surrounding said shaft and said extended portion of the sleeve, a ball bearing interposed between said casing and said sleeve, and reduction gearing comprising gears fixed respectively to said shaft and said extended portion of the sleeve.

9. In a driving mechanism for aeronautical propellers, in combination, an aeronautical motor comprising a crank shaft having a tapered stub end, a driving extension sleeve for said stub end keyed to said shaft and having a bearing surface complemental thereto, said sleeve overhanging the outer end of said stub shaft, a propeller journaled on said sleeve, bearings for the propeller located respectively on the overhanging and the inner ends of said extension sleeve, a gear fixed to said propeller, a driving gear carried by said stub shaft, and a unitary reduction gearing mechanism supported independently of the propeller and having gears in engagement with the aforesaid gears.

10. In a driving mechanism for aeronautical propellers, in combination, a driving shaft, a propeller journaled on said driving shaft, gears on said shaft and said propeller a pair of complementary reduction gear casing plates said plates being spaced from each other and surrounding said shaft and supported independently thereof, a pair of aluminum liners which are complementary to the interior of said plates and have transverse annular flanges on their peripheries for forming the exterior of the casing and a plurality of reduction gears journaled within said casing and meshing with corresponding gears on said shaft and said propeller.

In testimony whereof I hereunto affix my signature.

CHARLES B. KIRKHAM.